United States Patent
Sypniewski

(10) Patent No.: US 6,758,483 B1
(45) Date of Patent: Jul. 6, 2004

(54) SCOOTER DEVICE

(76) Inventor: Robert J. Sypniewski, 5510 US Hwy. 1, #Rd. 1 Coral Isle Trailer Park, Key West, FL (US) 33040

(*) Notice: Subject to any disclaimer, the term of this patent is extended or adjusted under 35 U.S.C. 154(b) by 0 days.

(21) Appl. No.: 09/966,381

(22) Filed: Sep. 28, 2001

(51) Int. Cl.$^7$ ................................................ B62M 1/00
(52) U.S. Cl. ........................... 280/87.041; 280/87.042; D21/765
(58) Field of Search ........................ 280/87.01, 87.021, 280/87.041, 87.042; 482/147, 146, 34; D21/760, 761, 765, 419, 421, 423

(56) References Cited

U.S. PATENT DOCUMENTS

| | | | |
|---|---|---|---|
| D187,706 S | | 4/1960 | Jenkins |
| 3,438,642 A | * | 4/1969 | Kite et al. ........................ 280/8 |
| D214,252 S | * | 5/1969 | Anderson .................. D21/765 |
| 3,512,798 A | * | 5/1970 | Siegel .................... 280/87.042 |
| 3,784,193 A | * | 1/1974 | Simjian ....................... 482/147 |
| 4,073,500 A | * | 2/1978 | Campeau ................ 280/87.041 |
| 4,135,726 A | * | 1/1979 | Beaver .................. 280/87.042 |
| 4,145,065 A | | 3/1979 | Kupka |
| 4,160,554 A | * | 7/1979 | Cooney .................. 280/87.042 |
| 4,336,952 A | | 6/1982 | Rochman |
| 4,673,180 A | * | 6/1987 | Rice ............................ 482/147 |
| 4,775,162 A | | 10/1988 | Chao |
| 5,062,630 A | * | 11/1991 | Nelson ......................... 482/34 |
| 5,201,659 A | * | 4/1993 | Nelson ........................ 434/255 |
| 5,879,276 A | * | 3/1999 | Miller ......................... 482/146 |
| D421,282 S | * | 2/2000 | Orr ............................ D21/765 |
| D430,635 S | * | 9/2000 | Danache .................... D21/765 |
| 6,176,817 B1 | * | 1/2001 | Carey et al. ................. 482/146 |
| 6,428,451 B1 | * | 8/2002 | Hall ............................ 482/146 |

FOREIGN PATENT DOCUMENTS

GB        2163659 A  *  3/1986  ........... A63C/17/26

* cited by examiner

Primary Examiner—Brian L. Johnson
Assistant Examiner—Kelly E Campbell

(57) ABSTRACT

A scooter device for providing a swingable skateboard device. The scooter device includes a first panel having a top side and a bottom side. The first panel is rigid. Each of a plurality of wheels is rotatably attached to the bottom side of the first panel. A handle is attached to the first panel. A second panel has an upper surface and a lower surface. The second panel is rotatably coupled to the first panel such that the lower surface of the second panel is facing the top side of the first panel.

1 Claim, 2 Drawing Sheets

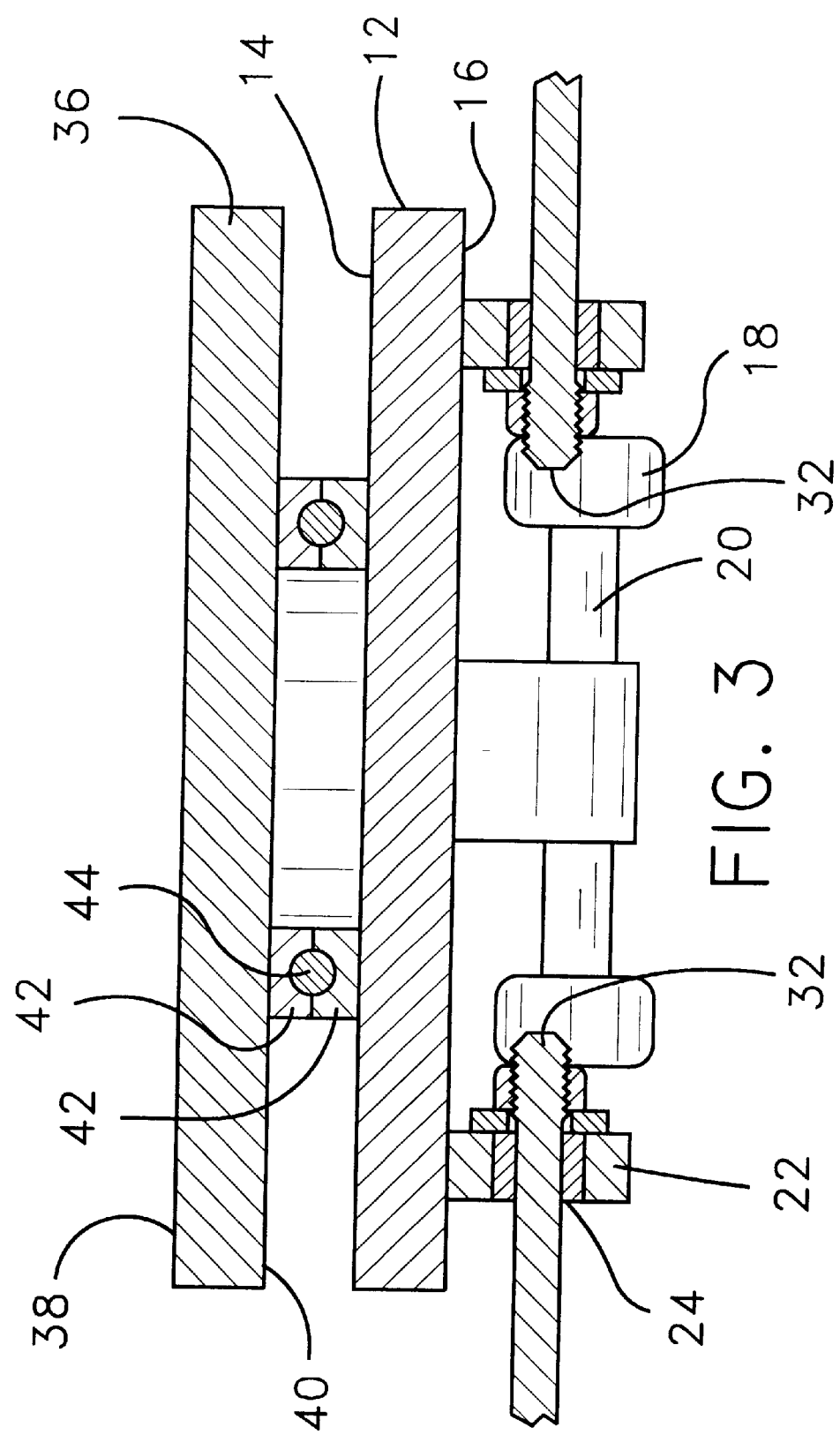

SCOOTER DEVICE

BACKGROUND OF THE INVENTION

Field of the Invention

The present invention relates to skateboard devices and more particularly pertains to a new scooter device for providing a swingable skateboard device.

SUMMARY OF THE INVENTION

The present invention meets the need of a swingable skateboard by providing a pair of panels rotatably coupled to each other, wherein one of the panels has a plurality of wheels attached thereto.

To this, the present invention generally comprises a first panel having a top side and a bottom side. The first panel is rigid. Each of a plurality of wheels is rotatably attached to the bottom side of the first panel. A handle is attached to the first panel. A second panel has an upper surface and a lower surface. The second panel is rotatably coupled to the first panel such that the lower surface of the second panel is facing the top side of the first panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross-sectional view of the present invention.

DESCRIPTION OF THE PREFERRED EMBODIMENT

Figure 2:
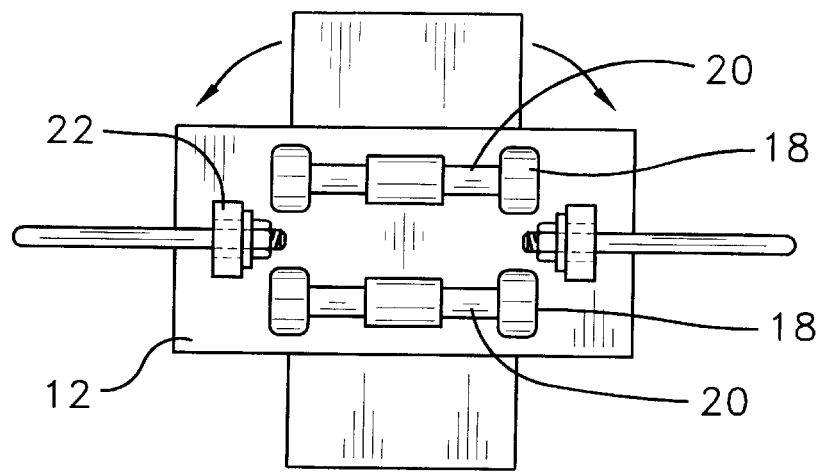
FIG. 2 is a schematic bottom view of the present invention.
Figure 1:
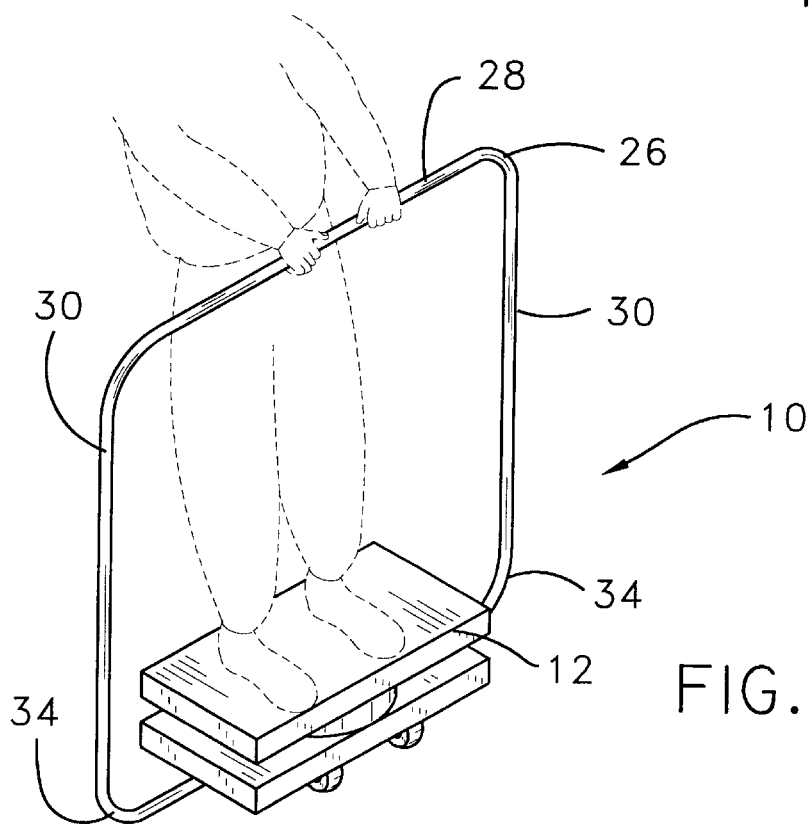
FIG. 1 is a schematic perspective view of a new scooter device according to the present invention.

With reference now to the drawings, and in particular to FIGS. 1 through 3 thereof, a new scooter device embodying the principles and concepts of the present invention and generally designated by the reference numeral 10 will be described.

As best illustrated in FIGS. 1 through 3, the scooter device 10 generally comprises a first panel 12 having a top side 14 and a bottom side 16. The first panel 12 is rigid and preferably has a rectangular shape.

Each of a plurality of wheels 18 is rotatably attached to the bottom side 14 of the first panel 12. The wheels 18 each have a parallel axis of rotation with respect to each other. The plurality of wheels 18 preferably comprises four wheels. Ideally, a pair of parallel-aligned axles 20 is attached to the bottom surface 14. Each of the axles 20 has a pair of wheels 18 rotatably attached thereto.

A pair of brackets 22 is attached to the bottom side 16. The brackets 22 are positioned generally adjacent to opposite edges of the first panel 12. The brackets 22 each comprise a plate having an aperture 24 extending therethrough.

A handle 26 is attached to the first panel 12. The handle 26 has a middle portion 28 and a pair of legs 30 such that the handle 26 is generally U-shaped. Each of the legs 30 has a free end 32. Each of the legs 30 has a bend 34 therein such that the free ends 32 extend toward each other. The free ends 32 are each extended through one of the apertures 24 and attached to one of the brackets 22. The legs 30 are orientated generally vertical and the middle portion 28 is located above the first panel 12.

A second panel 36 has an upper surface 38 and a lower surface 40. The second panel 36 is rigid and is rotatably coupled to the first panel 12 such that the lower surface 40 of the second panel 36 is facing the top side 14 of the first panel 12. The panels 12, 36 are rotatably coupled to each other by a pair of rings 42 with ball bearings 44 positioned between the rings 42 such that the first 12 and second 36 panels perform in generally the same manner as a lazy Susan.

In use, the user stands on the upper surface 38 of the second panel 36 and uses the device 10 somewhat like a skateboard. At the same time, the second panel 36 is rotatable with respect to the first panel 12 which adds a different level of challenge not found on traditional skateboards. The handle 26 helps the user maintain balance.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A recreational device comprising:

a first panel being elongate with a longitudinal axis and having a top side and a bottom side, said first panel being rigid;

a plurality of wheels being rotatably attached to said bottom side of said first panel, each of said wheels having a parallel axis of rotation, said axis of rotation of said wheels being parallel to said longitudinal axis of said first panel, said plurality of wheels comprising four wheels;

a pair of brackets being attached to said bottom side, said brackets being positioned generally adjacent to opposite end edges of said first panel;

a handle being attached to said first panel, said handle having a longitudinal axis parallel to said axis of rotation of said wheels, said handle having a substantially linear middle portion and a pair of substantially linear legs such that said handle is generally U-shaped, each of said legs having a free end, said substantially linear middle portion being oriented substantially parallel to said longitudinal axis of said first panel, each of said legs having a bend therein such that said free ends extend toward each other, each of said free ends being attached to one of said brackets such that said substantially linear legs are each orientated generally vertical and said substantially linear middle portion is located above said first panel in a generally horizontal orientation; and a second panel having an upper surface and a lower surface, said second panel being rigid, said second panel being rotatably coupled to said first panel such that said second panel rotates about a substantially vertical axis with respect to said first panel, said lower surface of said second panel is facing said top side of said first panel, said second panel being substantially coextensive with said first panel.

* * * * *